(No Model.) 3 Sheets—Sheet 1.

G. TAILLEUR.
ELECTRICAL JUNCTION BOX.

No. 589,760. Patented Sept. 7, 1897.

Witnesses:

Inventor:
George Tailleur
By Pierce & Fisher
Attorneys.

(No Model.) 3 Sheets—Sheet 3.

G. TAILLEUR.
ELECTRICAL JUNCTION BOX.

No. 589,760. Patented Sept. 7, 1897.

Witnesses:
Fred Gerlach
Oliver C. Dennis.

Inventor:
George Tailleur
By Prier & Fisher
Attorneys.

THE NORRIS PETERS CO., PHOTO-LITHO., WASHINGTON, D. C.

UNITED STATES PATENT OFFICE.

GEORGE TAILLEUR, OF CHICAGO, ILLINOIS, ASSIGNOR TO THE CHICAGO EDISON COMPANY, OF SAME PLACE.

ELECTRICAL JUNCTION-BOX.

SPECIFICATION forming part of Letters Patent No. 589,760, dated September 7, 1897.

Application filed June 7, 1897. Serial No. 639,648. (No model.)

*To all whom it may concern:*

Be it known that I, GEORGE TAILLEUR, a resident of the city of Chicago, in the county of Cook and State of Illinois, have invented certain new and useful Improvements in Electrical Junction-Boxes, of which I do declare the following to be a full, clear, and exact description, reference being had to the accompanying drawings, forming a part of this specification.

The present invention has for its object to provide an improved construction of junction-box more especially adapted for use in the manholes of underground electric systems.

One object of the invention is to provide a tight box for inclosing the electrical connections between the conductors, so that access of moisture thereto shall be prevented.

A further object of the invention is to improve the construction and arrangement of the pole-bars within the junction-box.

A further object of the invention is to provide means for automatically lighting the junction-box when it is opened for inspection or repairs.

A still further object is to provide means for shunting the circuit between the pole-bars and the conductor-terminals when it is desired to remove or replace the safety-catches or the like.

Another object of the invention is to provide the junction-box with permanent test-lamps, to provide improved bushing-seals through which the conductors will be admitted to the box, and to improve in other details the construction of the box and parts therein contained.

These several objects of invention are accomplished by the novel features of construction hereinafter described, illustrated in the accompanying drawings, and particularly pointed out by claims at the end of this specification.

Figure 1:
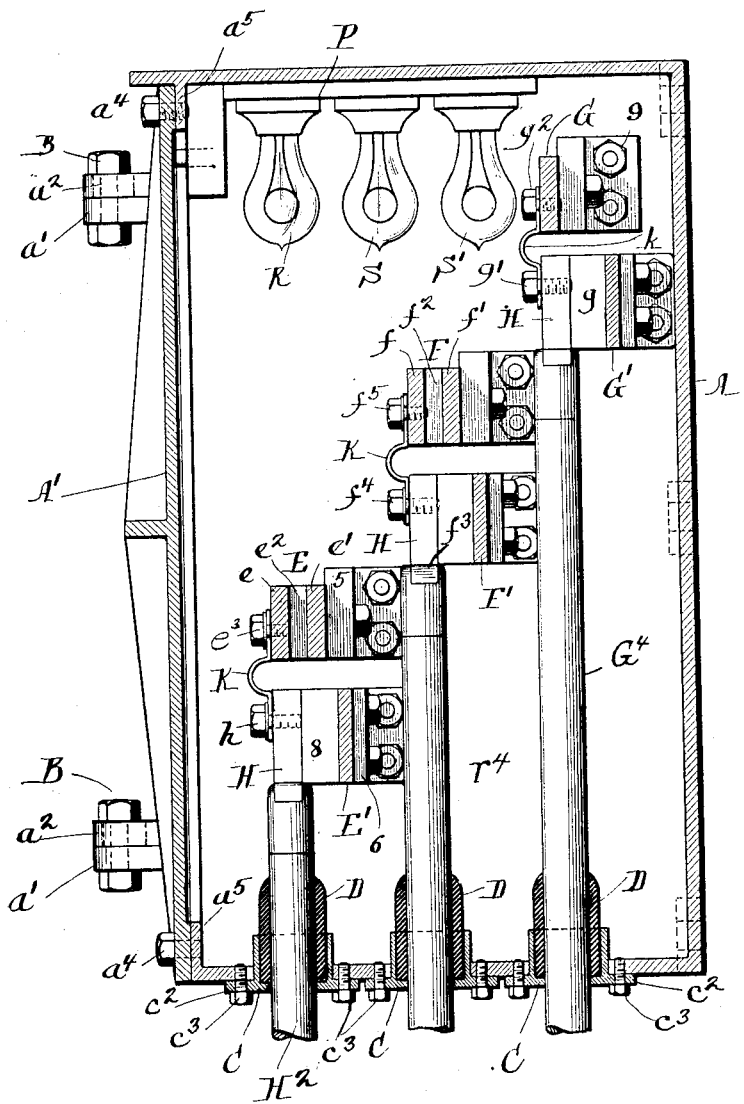
Figure 2:
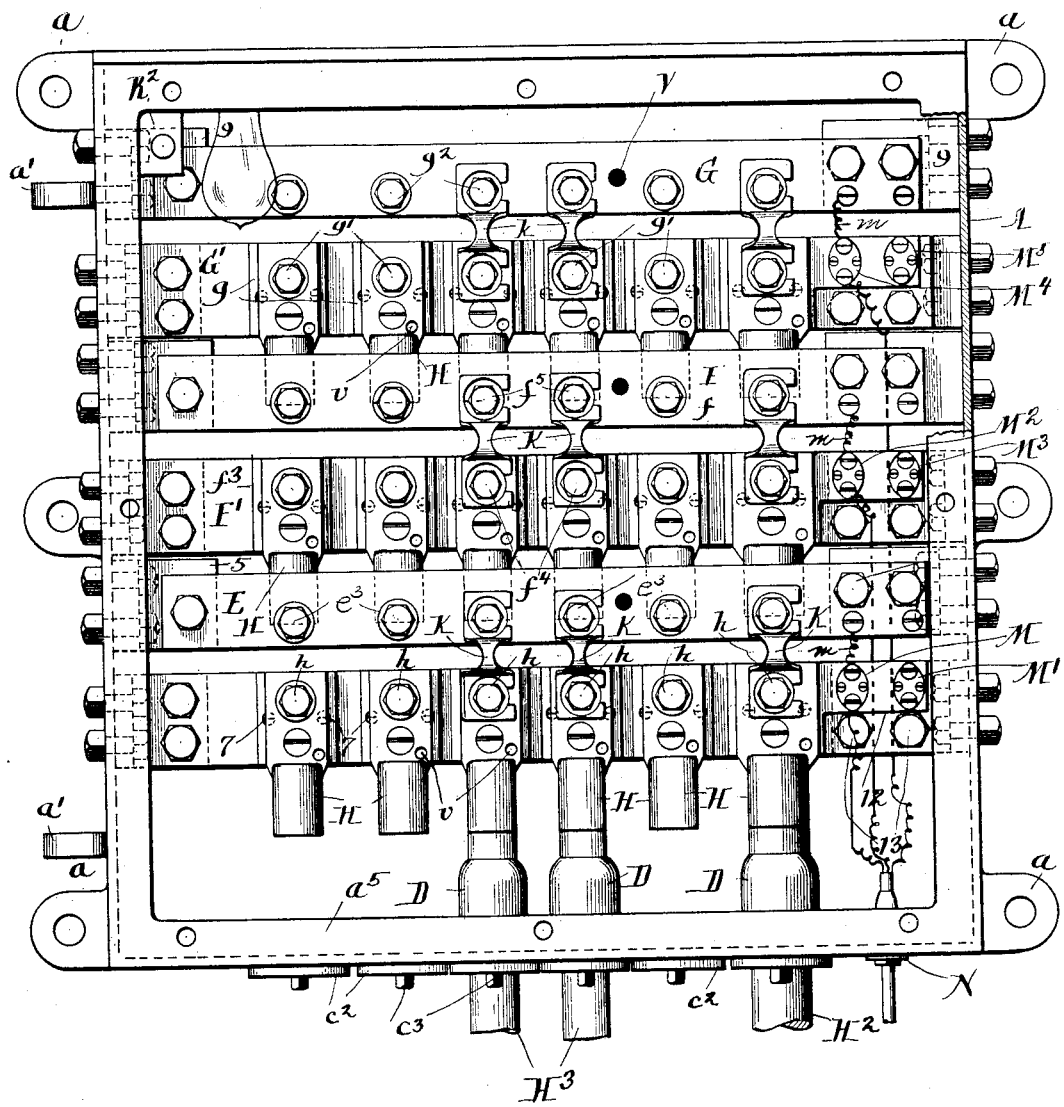
Figure 3:
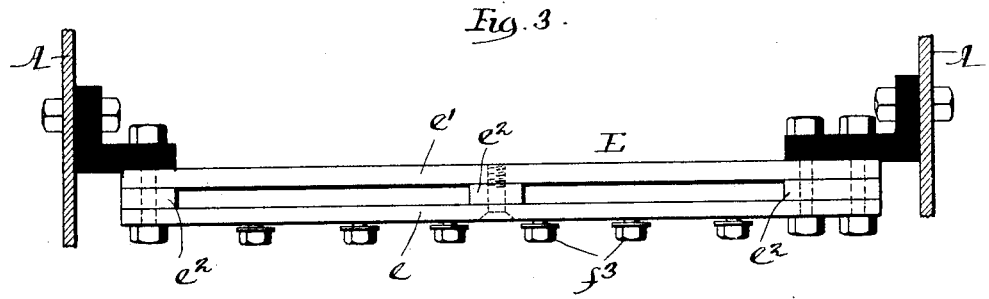
Figure 4:
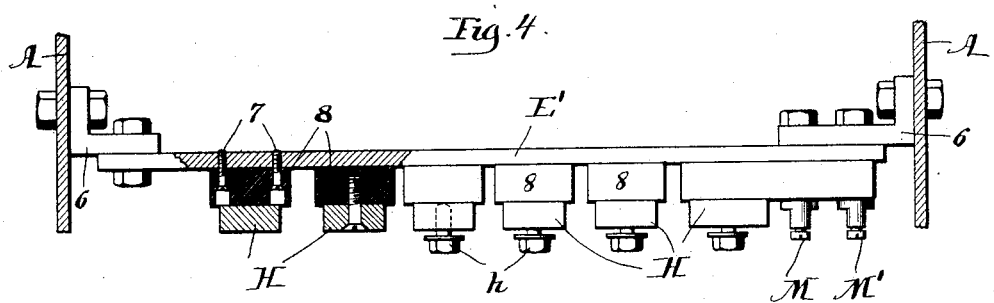
Figure 5:
Figure 6:
Figures 7, 8:
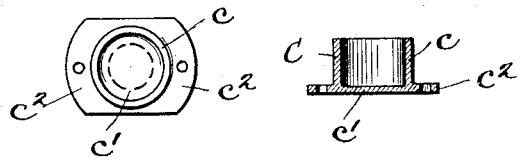

Figure 1 is a view in vertical cross-section through a junction-box embodying my invention. Fig. 2 is a front view of the junction-box with the door removed. Fig. 3 is a plan view of one of my duplex pole-bars, showing the manner of supporting the same. Fig. 4 is a plan view, partly in section, showing one of the supporting-bars for the conductor-terminals and the manner of connecting the terminals thereto. Fig. 5 is a diagrammatic view of the junction-box, showing more particularly the arrangement of the lamp-circuits. Fig. 6 is a detail view in cross-section illustrating the automatic switch for controlling the circuit of the lamp adapted to be lighted when the box is opened. Fig. 7 is a plan view, and Fig. 8 a view in vertical section through one of the bushings for the conductors before said bushings are bored to receive the conductor.

A designates the outer walls of my improved junction-box, these walls being preferably formed as a single casting. The back wall is shown as provided with suitable perforated lugs $a$, whereby the box may be conveniently fixed in position within the manhole. One of the side walls of the box A is provided at its front edge with lugs $a'$, adapted to receive hinge pins or pintles B, that pass through lugs $a^2$, projecting from the door A'.

By reference more particularly to Fig. 5 and to the dotted lines in Fig. 1 it will be seen that the lugs $a^2$ of the door A' are formed with slots or perforations larger than the pintles B, the purpose of this construction being to permit the door A' to be drawn inward bodily toward the body of the box, to which it will be attached by suitable screws $a^4$, that pass through holes in the edge of the door A' and through threaded holes formed in a flange $a^5$ around the front opening of the box. (See Fig. 1.) The hinge connection between the box and the door A' serves simply to support the door when it is swung open, the tight union of the door to the box being secured by the screws $a^4$ after the door has been closed.

One of the walls of the box A, preferably the bottom wall, is formed with a series of openings for the bushings C, the number of these openings corresponding with the number of bushings and the number of conductors that enter the box. These conductors will consist of any familiar type of wires or cables inclosed within suitable insulating pipes or covers, such as are commonly employed in underground systems. Each of the bushings C is formed with a raised and preferably annular portion $c$ and with a bottom plate $c'$, from which project the flanges $c^2$, these flanges being perforated to admit the screws $c^3$, whereby the bushings are attached to the wall of the box. Preferably the bushings C are formed of cast metal and with the bottom plates $c'$ imperforate, these bottom plates being subsequently bored with holes corresponding in size to the size of the conductor to be passed therethrough, as indicated by dotted lines in Fig. 7. After the conductors have been passed through the bushings the space between the annular wall $c$ of the bushings and the conductors will be filled with a suitable plastic composition D, thereby securing a perfectly tight joint between the conductors and the bushings.

In the accompanying drawings I have shown what may be termed a "six-way" junction-box, because such box is adapted to admit six groups of conductors; but it will be understood that without departing from the spirit of the invention the box may be modified for any number of conductors.

Within the body of the box and preferably supported from the side walls thereof extend three pole-bars E F G and corresponding terminal-supports E', F', and G'. The pole-bar E in the arrangement shown is for connection with the negative conductors, the pole-bar F for connection with the positive conductors, and the pole-bar G for connection with the neutral conductors of the system. Manifestly, however, it is not essential that a neutral pole-bar should be employed except in systems where a neutral conductor is used. The pole-bars E and F are duplex bars—that is to say, each of these bars consists of plural plates (preferably two) in order to afford a more effective means for receiving current from the conductors.

The pole-bar E is shown as comprising two plates $e$ and $e'$, preferably of copper, electrically connected by interposed copper blocks $e^2$, and the pole-bar E is supported from the walls of the box by means of the angular brackets 5, of hard rubber or like insulating material, that are bolted to the ends of the pole-bar and to the box-wall, as clearly shown in Figs. 1 and 3 of the drawings. Beneath the pole-bar E extends the terminal-support E', that comprises a metal bar attached to the side walls of the box by suitable angular brackets 6, and to the face of the terminal-support E' are attached, as by screws 7, the blocks 8 of insulating material, such as hard rubber or the like, to which are attached the terminals H of the negative conductors. These terminals H are of usual or suitable construction and comprise flat upper portions of copper having sockets to receive the ends of the conductors. In the accompanying drawings I have shown but three negative conductors $H^2$ and $H^3$ $H^3$, the conductor $H^2$ being a feeder-conductor that leads from the central station, while $H^3$ $H^3$ are the main or service conductors. Each of the terminals H is provided with a binding post or screw $h$ to receive one end of a safety fuse or catch K, the opposite end of which engages a corresponding binding-post $e^5$ on the negative pole-bar E. In like manner the positive pole-bar F consists of two plates $f$ and $f'$, united by space-blocks $f^2$ and connected to the walls of the box A by angular brackets 5. Beneath the pole-bar F extends the terminal-support F', similar in construction and arrangement to the bar E' and in like manner supported from the walls of the box A. The terminals H of all the positive conductors are connected to the pole-bar F' through the medium of insulating-blocks $f^3$, and the binding-posts $f^4$ of the terminals of the positive conductors are united by safety fuses or catches K with the binding posts or screws $f^5$ on the pole-bar F. The neutral pole-bar G is shown as comprising a single bar that is sustained from the side walls of the box by means of angular brackets 9 of hard rubber or like insulating material, and beneath this pole-bar G extends the terminal-support G' for the neutral conductors. The terminals H of these various conductors are attached to the support G' through the medium of the insulating-blocks $g$. The terminals H of the neutral conductors have their binding-posts $g'$ connected, as by safety fuses or catches $k$, with the binding-posts $g^2$ of the pole-bar G. In the drawings I have shown but one positive conductor $F^4$ and one neutral conductor $G^4$, but it will be understood that besides the main positive and neutral feeder-conductors any desired number of main or service conductors will lead from the positive and neutral pole-bars.

By reference more particularly to Fig. 1 of the drawings it will be seen that the several pole-bars are arranged out of vertical alinement, and this I regard as the preferable arrangement, because it not only enables access to the pole-bars, the terminals, and the safety-catches to be more readily had, but in event of the destruction of one of the safety-catches incident to an overloaded circuit or the like or in event of the dropping of a catch when placing it in position the danger of thereby creating a short circuit is avoided. It will be observed that all the conductor-terminals of like polarity lead to the same pole-bar, and the arrangement of the pole-bars is such that upon the opening of the box they can be most conveniently reached for repairs or adjustment of the parts.

By reference more particularly to Fig. 2 of the drawings it will be seen that the lower portions of insulated blocks 8 at such points are cut away or reduced, as at 12, the bolts 13 that connect the blocks and the supporting-bars with the terminal-supports and brackets passing through such reduced portion of the insulating-blocks. To the base of these blocks are attached metal plates M, M', $M^2$, $M^3$, $M^4$, and $M^5$, each provided with two binding-posts, to which pressure-wires that lead from the junction-box to the central station will be united, these wires extending in cable form through a suitable bushing N in the bottom of the box. Each of the pole-bars E, F, and G is provided also with binding-posts, to which the pressure-wires will be connected by suitable fuse wires or loops $m$.

Permanently attached to a suitable support P, secured within the box A, preferably at its top, are the incandescent lamps R, S, and S'. The lamp R is connected with the neutral and either the positive or negative pole-bar by a circuit R', in which is interposed a switch $R^2$, contained within a chamber $R^3$, fixed within the box adjacent the hinge side of the door A'. The switch $R^2$ consists of a spring-plate that is provided with a plug $r$, that projects through the chamber $R^3$ and into position to be struck by the door A' when the door is closed. The switch $R^2$, when the door is closed, is forced away from the adjacent end of the circuit-wire R', thereby breaking the circuit at such point, but when the door is open the spring-switch $R^2$ closes the circuit through the wire R' and causes the lamp R to burn. It will thus be seen that when the box is opened current is caused to pass through the circuit-wire R' and the interior of the box is automatically lighted by the lamp R, so that all parts of the box are at once made visible.

The lamps S S' are for testing purposes and are arranged in series, as shown by the diagrammatic view, Fig. 5. From these lamps extend short wires $s$, the terminals of which may be connected to different pole-bars or conductor-terminals in order to test the current passing therethrough.

When the safety-catches K are ruptured or broken and it becomes necessary to replace them, or when changes or repairs are required at the conductor-terminals, it is desirable that the shunt-circuit be established between the terminals and pole-bars of like polarity in order to guard against arcing of the current between the contacts and consequent danger of burning the adjacent surfaces. For this reason I provide each of the pole-bars with a plug-hole V and each of the terminals H with a plug-hole $v$ to receive the ends or plug-terminals of a shunt-wire or like electrical connection during the time that repairs are being made.

By employing pole-bars formed of plural plates, as hereinbefore described, much greater extent of radiating-surface is thereby afforded, so that the heat incident to the passage of current is more effectively dissipated, and by extending the pole-bars directly across the ends of the conductor-terminals the necessity of using supplemental connections or risers, as in prior devices, is avoided. It will be understood, of course, that a suitable rubber or like gasket or packing-strip will be interposed between the door A' and the opposing edge of the box in order that a perfect moisture-tight joint may be secured when the door is closed.

Having thus described my invention, what I claim as new, and desire to secure by Letters Patent, is—

1. An electrical junction-box having holes in one of its walls through which the conductors pass in combination with perforated flanged bushings the bodies of said bushings projecting through said holes and the flanges of said bushings being secured to the box-wall and suitable packing interposed between the bodies of the bushings and the conductors passing therethrough.

2. In an electrical junction-box the combination with a series of conductors of different polarities entering said box, of a series of pole-bars arranged within said box out of vertical alinement.

3. In an electrical junction-box the combination with a series of conductors leading through the wall of said box and pole-bars with which said conductors are connected, said pole-bars extending across the ends of said conductors and being connected therewith by terminal-supports.

4. In an electrical junction-box the combination with a series of conductors entering said box, of a series of terminal-supports extending across the corresponding conductors and connected to the terminals thereof, and a corresponding series of pole-bars arranged adjacent said terminal-supports and electrically connected with the conductor-terminals.

5. In an electrical junction-box the combination with a series of conductors of different polarity entering said box, of a series of terminal-supports extending across and connected with the terminals of said conductors and a series of pole-bars extending parallel with and adjacent to their corresponding terminal-supports and electrically connected with the conductor-terminals.

6. In an electrical junction-box the combination with a series of conductors, of one or more pole-bars formed of plural plates connected with the conductor-terminals.

7. In an electrical junction-box the combination with a series of conductors, of one or more pole-bars formed of interspaced plates extending across the ends of the conductor-terminals, and electrically connected therewith by terminal-supports.

8. In an electrical junction-box, pole-bars for the conductor-terminals provided with sockets to receive shunt-circuit plugs.

9. In an electrical junction-box the combination with the conductors and pole-bars of plural test-lamps arranged in series and fixed within the box and circuit-wires whereby said lamps may be electrically connected with the pole-bars.

GEORGE TAILLEUR.

Witnesses:
OLIVER C. DENNIS,
ALBERTA ADAMICK.